United States Patent
Witwer et al.

(10) Patent No.: US 7,370,718 B2
(45) Date of Patent: May 13, 2008

(54) HOOD WITH INTEGRAL AIR DUCT

(75) Inventors: Jeffrey David Witwer, Clayton, NC (US); Stanley Kermit Hall, Autryville, NC (US); Jennifer Lynn Jaramillo, Raleigh, NC (US); Roger Howard Tesch, Cary, NC (US); John Louis Bocksnick, Willow Spring, NC (US)

(73) Assignee: Deere & Company, Moline, IL (US)

( * ) Notice: Subject to any disclaimer, the term of this patent is extended or adjusted under 35 U.S.C. 154(b) by 370 days.

(21) Appl. No.: 11/091,458

(22) Filed: Mar. 28, 2005

(65) Prior Publication Data

US 2006/0213708 A1 Sep. 28, 2006

(51) Int. Cl.
*B62D 25/12* (2006.01)
*B62D 25/10* (2006.01)

(52) U.S. Cl. ............. 180/69.2; 180/68.1; 180/68.6

(58) Field of Classification Search ...... 180/68.1–68.4, 180/68.6, 69.2, 69.21, 69.24, 69.25
See application file for complete search history.

(56) References Cited

U.S. PATENT DOCUMENTS

| | | | | |
|---|---|---|---|---|
| 4,341,277 A | * | 7/1982 | Adamson et al. | 180/68.1 |
| 4,454,926 A | | 6/1984 | Akins | 180/68.1 |
| 4,606,422 A | * | 8/1986 | Jewett | 180/68.1 |
| 4,771,844 A | * | 9/1988 | Bassett | 180/68.1 |
| 5,193,636 A | | 3/1993 | Holm | |
| 5,199,521 A | * | 4/1993 | Samejima et al. | 180/68.1 |
| 5,678,648 A | * | 10/1997 | Imanishi et al. | 180/68.1 |
| 5,794,733 A | | 8/1998 | Stosel et al. | 180/68.1 |
| 5,947,219 A | | 9/1999 | Peter et al. | |
| 6,167,976 B1 | | 1/2001 | O'Neill et al. | |
| 6,202,777 B1 | | 3/2001 | Surrudge | 180/68.1 |
| 6,823,955 B2 | * | 11/2004 | Hall et al. | 180/68.1 |
| 7,213,667 B2 | * | 5/2007 | Goebert et al. | 180/68.1 |
| 2004/0045754 A1 | * | 3/2004 | Bland | 180/68.1 |
| 2006/0016632 A1 | * | 1/2006 | Samejima et al. | 180/68.1 |

FOREIGN PATENT DOCUMENTS

DE 899 909 12/1953

* cited by examiner

*Primary Examiner*—Christopher P. Ellis
*Assistant Examiner*—Vaughn T Coolman

(57) ABSTRACT

A hood covers an internal combustion engine on the rear of a grass mowing machine. The hood has a top surface with a plurality of air intake openings recessed below the top surface, and an integral air duct. The integral air duct extends over the engine between the air intake openings and an air inlet side of the radiator and/or oil cooler adjacent the rear of the grass mowing machine. The air intake openings closest to the air inlet side of the radiator and/or oil cooler are dimensioned to limit the air intake velocity and prevent buildup of debris on screens or grilles over the openings.

8 Claims, 3 Drawing Sheets

HOOD WITH INTEGRAL AIR DUCT

FIELD OF THE INVENTION

This invention relates to cooling systems for motor vehicles, and more specifically to a hood enclosing an engine and related cooling system on a large grass mowing machine, tractor or similar vehicle. The hood includes a screened cooling air intake and a duct for directing ambient cooling air to a radiator and/or oil cooler.

BACKGROUND OF THE INVENTION

Conventional hoods or shrouds on large grass mowing machines, tractors and similar off-road or agricultural vehicles typically enclose an engine, cooling system, and other vehicle components. Such vehicles commonly utilize liquid cooled internal combustion engines which generate heat during their operation. Liquid-cooled engine employ pressurized coolant circulated through the engine to absorb heat. The heated coolant is subsequently passed through a heat exchanger such as a radiator to dissipate heat from the coolant to the atmosphere, after which the coolant is recirculated to the engine for further engine cooling. As the coolant is passed through the heat exchanger, air flows through the heat exchanger to absorb heat and carry it out into the atmosphere. Air is commonly drawn or propelled through the radiator and/or oil cooler by use of a fan.

The capacity of a cooling system in such a vehicle depends on many factors including the velocity and volume of air flowing through the heat exchanger, as well as the distribution of the air flow over the available heat exchange surface of the radiator and/or oil cooler. The surface area of the air intake on the hood of such a vehicle may be as large as six square feet or more. These vehicles may be used for cutting grass or other vegetation, so the air used to cool the radiator is frequently contaminated with dust, grass clippings and similar debris. Typically, such vehicles will include grilles or screens on their hoods to reduce debris present in the cooling air while allowing the air to pass into the area enclosed by the hood to cool the engine by interaction with the radiator and/or oil cooler. However, debris may accumulate on and around the outer surface of the grille or screen, clogging the intake and restricting the air flow.

In these vehicles, debris tends to build up rapidly and accumulate first on those areas of a grille or screen where air flows at the highest velocity. Air velocity at some areas of a grille or screen may be substantially higher than the velocity at other areas. For a grille or screen on or above the top surface of a vehicle hood, areas of the grille or screen that are relatively close to the air inlet side of the radiator and/or oil cooler may have air flow velocities several times higher than areas further away from the air inlet side of the radiator and/or oil cooler. For example, the air velocity may be as high as 20,000 mm/second at air intake openings near the air inlet side of the radiator and/or oil cooler, and less than 1000 mm/second at air intake openings furthest from the radiator and/or oil cooler. If enough debris accumulates to block the portion of the grille or screen with the highest air velocity, the effective air intake area is reduced. As a result, the vehicle's engine may not be cooled as efficiently or quietly.

Hoods or shrouds for large grass mowing machines, tractors and similar vehicles may be made from a combination of sheet steel, plastic and perforated screens or grilles. For example, the hood for the 1600 Turbo Wide-Area Mower manufactured by Deere & Company of Moline, Ill. includes sheet steel panels and a perforated screen providing an intake area that draws air from the top and sides of the machine over the hood. Some vehicles also may include a baffle to prevent the air supply from being heated by the engine as the air is drawn to and passed through the radiator and/or oil cooler. Some hoods may be relatively heavy (weighing as much as 200 pounds or more), expensive to build and assemble, and provide inefficient air flow.

A hood or shroud for a large grass mowing machine, tractor or similar vehicle is needed that has reduced weight and cost. A hood or shroud is needed for such a vehicle that provides improved air flow efficiency. A hood or shroud is needed that can provide a supply of cooling air to an engine for a large grass mowing machine, tractor, or similar vehicle without the flow being interrupted or compromised due to blockages of the grille or screen caused by dust, grass clippings or similar debris. An air intake for a hood on a large grass mowing machine, tractor or similar vehicle is needed that can provide more uniform and even air flow velocity across different areas of a grille or screen. A hood for a large grass mowing machine, tractor or similar vehicle is needed that includes an air intake that provides more uniform air flow while minimizing engine noise escaping from the engine compartment.

SUMMARY OF THE INVENTION

A hood hinged to the rear of a grass mowing machine includes a rotational molded plastic shell having a top surface, left and right side panels, and first and second ends. The first end of the hood is adjacent the rear of the grass mowing machine, and an integral air duct below the top surface of the hood directs cooling air to the air inlet side of the radiator and/or oil cooler for engine cooling. The top of the hood has a number of air intake openings into the integral air duct. The air intake openings are dimensioned to provide more uniform air flow velocities through each opening, so that debris does not clog the screens or grilles over the openings. To provide more uniform air flow, each of the air intake openings may decrease in area from the second end to the first end of the hood.

The hood has reduced weight and cost compared to conventional hoods used on large grass mowing machines. The hood provides improved air flow efficiency, and provides a supply of cooling air to the engine without the flow being interrupted or compromised due to blockages of the grille or screen. The hood includes air intake openings that can provide more uniform and even air flow velocity across different areas of a grille or screen. The hood provides more uniform air flow while minimizing engine noise escaping from the engine compartment.

DESCRIPTION OF THE PREFERRED EMBODIMENT

Figure 1:
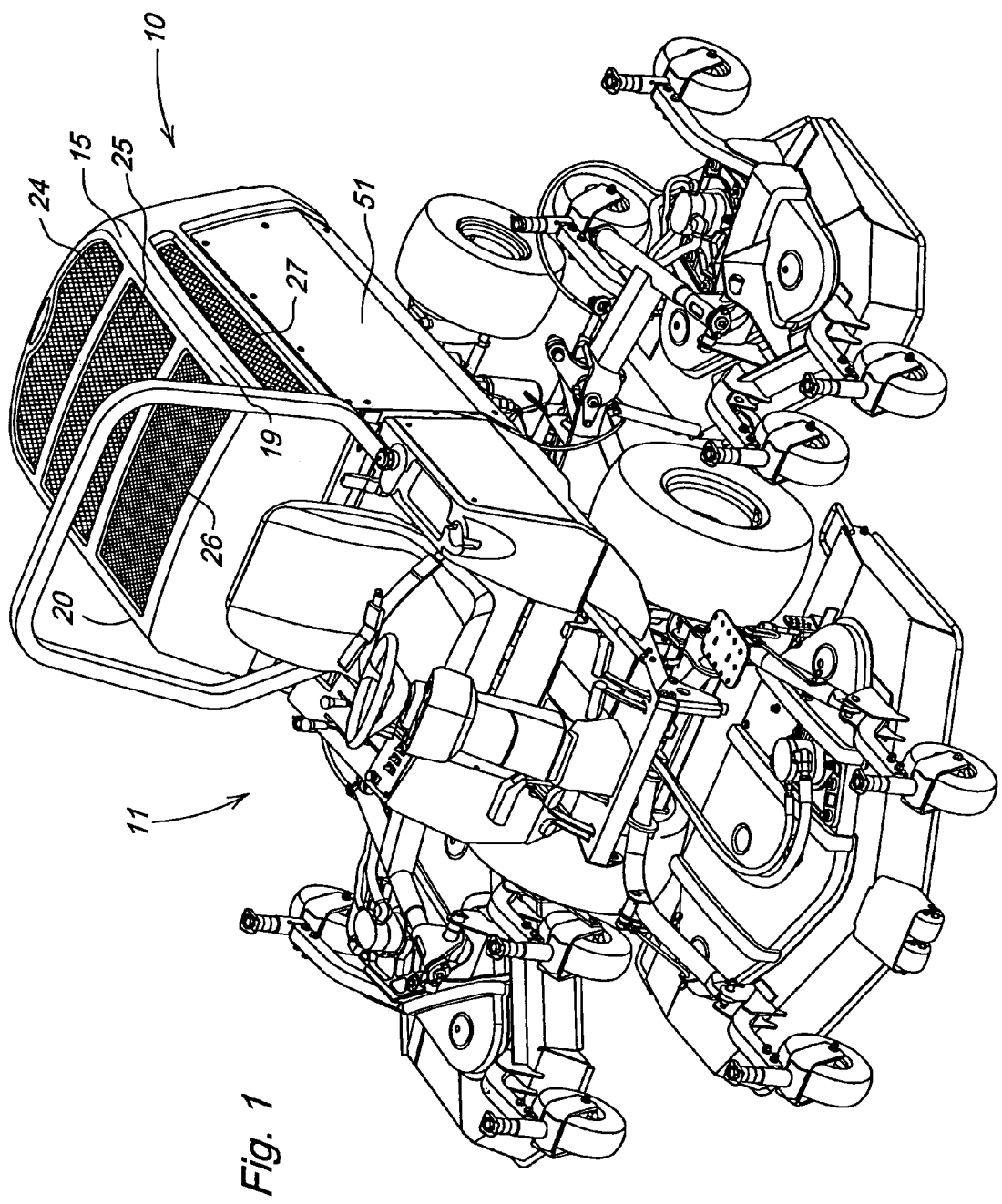
FIG. 1 is a top perspective view of a large grass mowing machine having a hood with an integral air duct according to a first embodiment of the invention.
Figure 2:
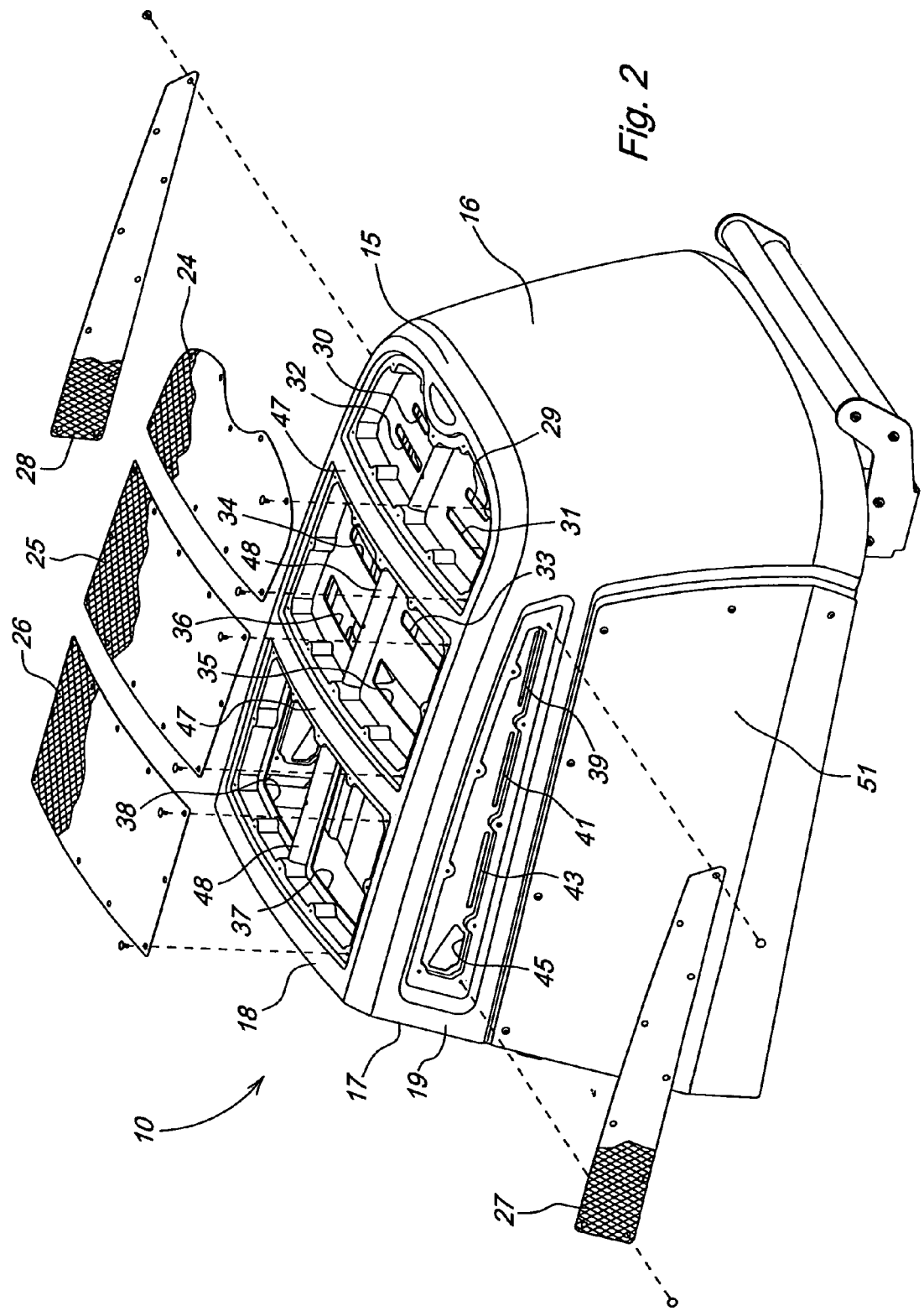
FIG. 2 is an exploded perspective view of a hood with an integral air duct according to a first embodiment of the invention.
Figure 3:
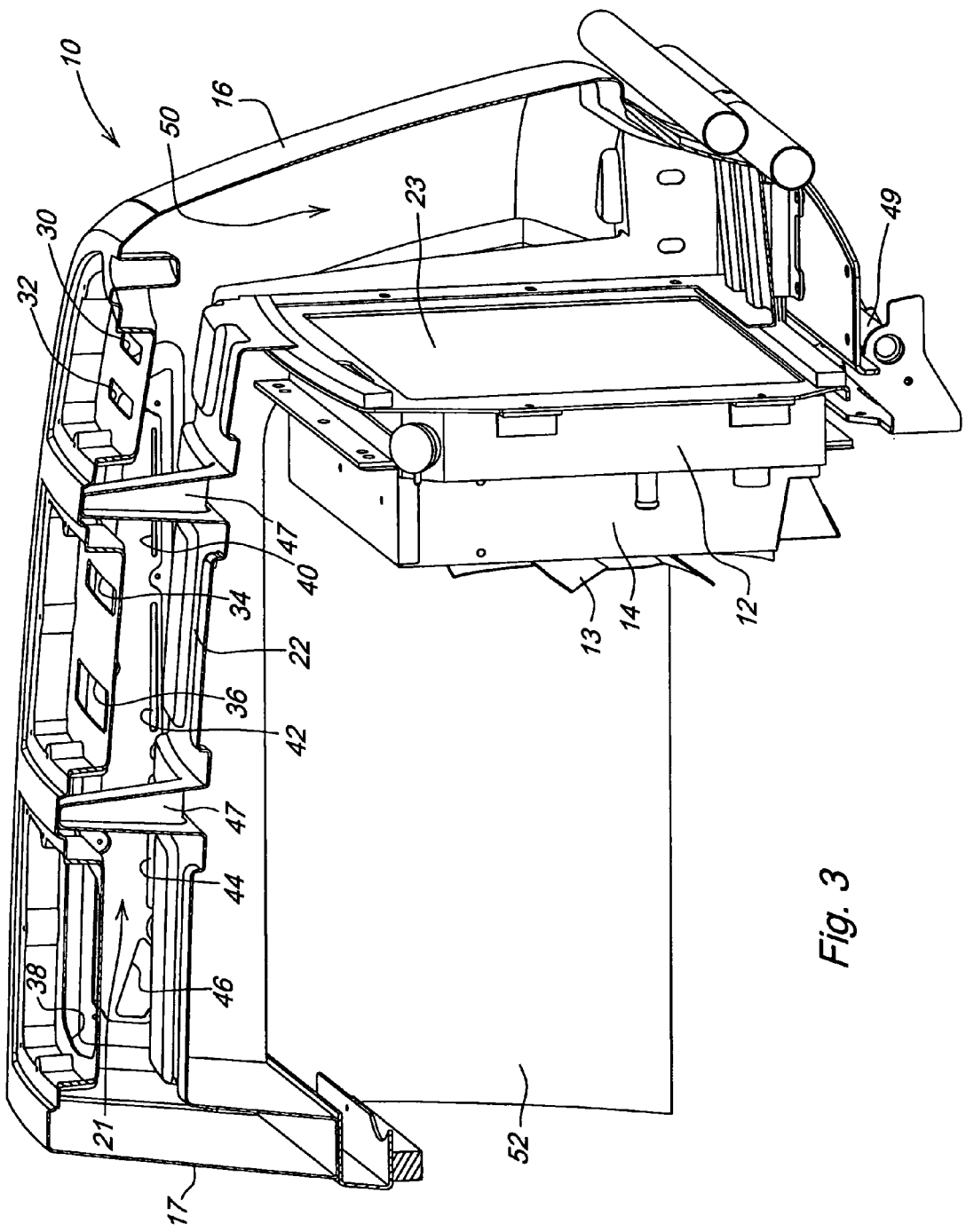
FIG. 3 is a perspective view, partially in section, of a hood with an integral air duct according to a first embodiment of the invention.

As shown in FIGS. 1-3, in a first embodiment of the invention, hood 10 may enclose an engine supported on a vehicle frame at or near the rear of a large grass mowing machine 11. The hood may be located behind the operator's station. The engine may be an internal combustion engine with a cooling system including radiator and/or oil cooler 12, fan 13 and fan shroud 14 facing toward the rear of the vehicle. The hood may be connected by hinge 49 to the rear of the frame of the grass mowing machine for opening and servicing the engine.

In one embodiment, hood 10 may be a rotational molded plastic shell 15 with a first end 16 and a second end 17, an outwardly convex, rounded, or sloped top surface 18, and left and right side surfaces 19 and 20. Rotational molding, also known as rotomolding, involves loading a plastic resin into a mold that is heated as it is rotated slowly on both a vertical axis and a horizontal axis. The simultaneous heating and rotation distributes the plastic on the inner surfaces of the mold and fuses it into the desired shape. Hoods manufactured by rotational molding according to a preferred embodiment of the invention have approximately 20% reduction in weight and reduced cost compared to conventional hoods of the same or similar size for large grass mowing machines.

In one embodiment, hood 10 may have an integral air duct 21 under the top surface and extending generally horizontally between the air intakes and air inlet side 23 of radiator and/or oil cooler 12. Integral air duct 21 may be formed between the top surface 18 of the hood and internal baffle 22 which may shield and partition or separate the integral air duct from the engine. Additionally, the hood and radiator may define an air duct 50 extending generally vertically between the first end 16 of the hood and the air inlet side 23 of radiator and/or oil cooler 12. Air ducts 21, 50 may direct air from the air intakes rearwardly toward the air inlet side 23 of radiator and/or oil cooler 12, where fan 13 may draw the intake air into and through the radiator and/or oil cooler.

In one embodiment, internal baffle 22 may provide a generally horizontal surface spaced about 1 inch to about 6 inches below the top surface of the hood. Thus, the top surface 18 of the hood and the internal baffle 22 together define integral air duct 21 which may extend over the engine toward the air inlet side 23 of the radiator adjacent the rear of a grass mowing machine. The first end of the hood and the radiator and/or oil cooler together define air duct 50 which may extend downwardly from integral air duct 21. Optionally, an internal baffle (not shown) may be included within air duct 50 to direct or divert some of the air to either the radiator or oil cooler.

In one embodiment, hood 10 may have a plurality of separate perforated screens or grilles that are positioned on or near the top surface of the hood. The screens or grilles allow air flow from the outside to be pulled through integral air duct 21 between the top surface 18 of the hood and internal baffle 22. Each screen or grille may be placed over one or multiple air intakes. For example, each screen or grille may be placed over as many as four or more separate air intakes. As will be described in more detail below, at least some of the air intakes may have areas substantially smaller than the screens, and the air intake dimensions are configured to reduce or minimize congestion of grass clippings and other debris on the screen or grille. In one embodiment, screens or grilles 24-26 may cover air intakes on the top surface of the hood. Screens or grilles 27-28 may cover air intakes on the left and right sides of the hood.

In one embodiment, the hood includes a plurality of exterior air intake openings recessed about ½ inch to about 2 inches from the top and side surfaces of the hood. Alternatively, the exterior air intake openings may be at or project from the top and side surfaces of the hood. The exterior air intake openings are dimensioned and positioned to optimize air flow into air ducts 21, 50 to cool the engine. The exterior air intake openings may be dimensioned and positioned to reduce the air flow velocity at openings that are closest to the air inlet side of the radiator. The dimensions provide more uniform air flow over all openings. For example, the air flow velocity at each opening may be not more than twice the air flow velocity at any other opening. The air intake openings closest to the air inlet side of the radiator and/or oil cooler may be dimensioned to have smaller areas than openings further from the air inlet side of the radiator and/or oil cooler. As a result of the reduced or stepped dimensions of the exterior air intake openings, clogging of the screens or grilles may be minimized or substantially reduced.

In one embodiment, at least some of the exterior air intake openings may have smaller areas than the screens or grilles. Additionally, the exterior air intake openings in the top surface of the hood may be reduced or stepped down in surface area between the second end of the hood; i.e., furthest from the air inlet side of the radiator and/or oil cooler; and the first end of the hood; i.e., nearest the air inlet side of the radiator and/or oil cooler. The top air intake openings closer to the first end of the hood have at least one dimension that is smaller than the openings near the second end of the hood. The smallest openings may be located in the top surface near the first end of the hood, i.e., closest to the air inlet side of the radiator and/or oil cooler, and the largest openings may be in the top surface near the second end of the hood, i.e., furthest from the air inlet side of the radiator and/or oil cooler.

For example, in one embodiment, top air intake openings 29-30 near the first end of the hood each may have an area of less than about 5 square inches. Top air intake openings 31-32 each may have an area of less than about 10 square inches. Top air intake openings 33-34 each may have an area of less than about 15 square inches. Top air intake openings 35-36 each may have an area of less than about 20 square inches. Top air intake openings 37-38 nearest the second end of the hood each may have an area of less than about 50 square inches.

Similarly, the exterior air intake openings in the left and right sides of the hood may be reduced or stepped down in surface area between the second end of the hood; i.e., furthest from the air inlet side 23 of the radiator and/or oil cooler; and the first end of the hood; i.e., closest to the air inlet side 23 of the radiator and/or oil cooler. Side air intake openings closer to the first end of the hood may have at least one dimension that is smaller than the openings near the second end of the hood. The smallest openings may be located in the side surface near the first end of the hood, i.e., closest to the air inlet side of the radiator and/or oil cooler, and the largest openings may be in the side surface near the second end of the hood, i.e., furthest from the air inlet side of the radiator and/or oil cooler.

In one embodiment, side air intake openings 39-40 near the first end of the hood each may have an area of less than about 5 square inches. Side air intake openings 41-42 each may have an area of less than about 10 square inches. Side air intake openings 43-44 each may have an area of less than about 15 square inches. Side air intake openings 45-46 near the second end of the hood each may have an area of less than about 20 square inches.

In one embodiment, the top surface of the hood may include ribs 47 between the screens or grilles, and support structures 48 under the screens or grilles. Additional panels 51, 52 may be attached to the left and right side surfaces 19, 20.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention claimed is:

1. An apparatus comprising:
 a plastic hood covering an internal combustion engine having a radiator with an air inlet side facing the rear of a grass mowing machine; the plastic hood having a top surface with a plurality of air intake openings recessed below the top surface; an air duct integral with the plastic hood under the air intake openings and extending horizontally over the engine between the top surface of the hood and an internal baffle separating the air duct from the engine, and around the rear of the crass mowing machine to the air inlet side of the radiator;
 wherein the air intake openings closest to the air inlet side of the radiator are dimensioned to limit the air intake velocity therethrough.

2. The apparatus of claim 1 wherein the plastic hood includes a left side surface and a right side surface, each side surface having a plurality of air intake openings.

3. The apparatus of claim 2 wherein the air intake openings in the side surfaces that are closest to the air inlet side of the radiator are dimensioned to limit the air intake velocity therethrough.

4. The apparatus of claim 1 wherein the plastic hood has a rounded top surface.

5. The apparatus of claim 1 wherein the plastic hood is hinged to the rear of the grass mowing machine.

6. The apparatus of claim 1 wherein the plastic hood is rotational molded.

7. The apparatus of claim 1 further comprising a plurality of screens over the air intake openings.

8. The apparatus of claim 1 wherein the air intake openings closest to the rear of the grass mowing machine are smaller in area than the air intake openings closest to the front of the grass mowing machine.

* * * * *